Aug. 30, 1927.

W. F. SMITH

TRACTOR

Filed Dec. 7, 1921

1,640,621

6 Sheets-Sheet 1

Inventor
William F. Smith
By his Attorney
Paul Kolisch

Aug. 30, 1927.

W. F. SMITH 1,640,621

TRACTOR

Filed Dec. 7, 1921 6 Sheets-Sheet 2

Inventor
William F. Smith
By his Attorney
Paul Kolisch

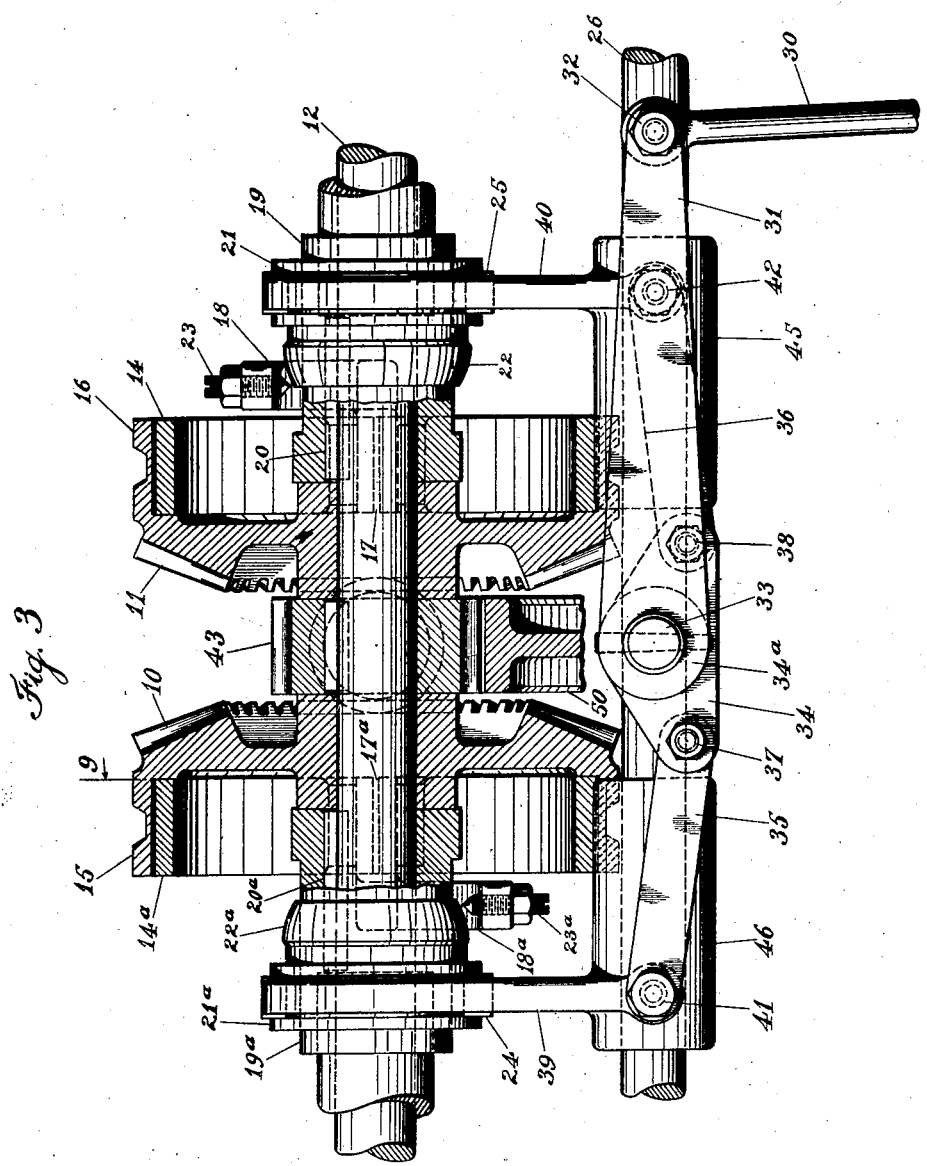

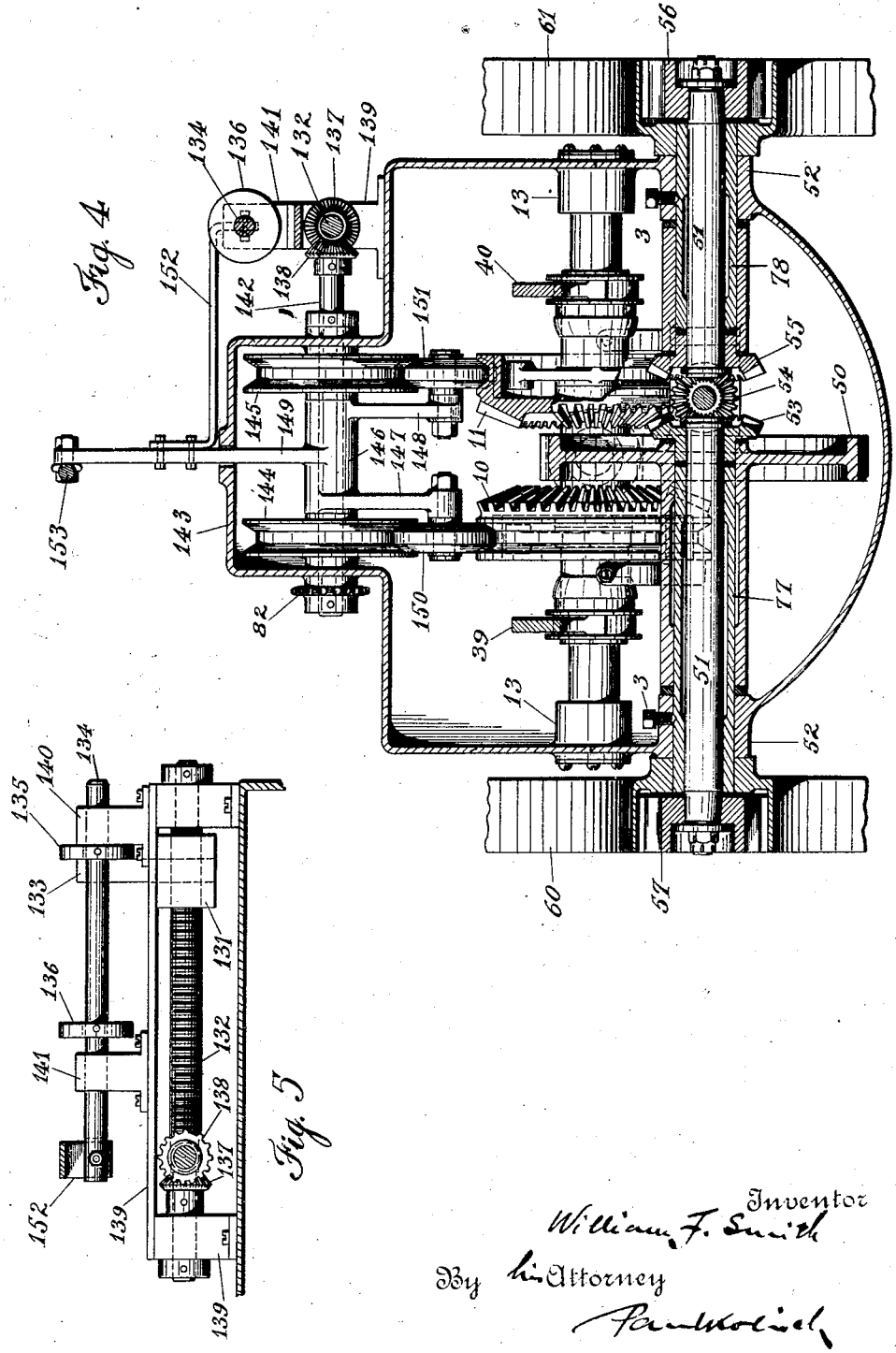

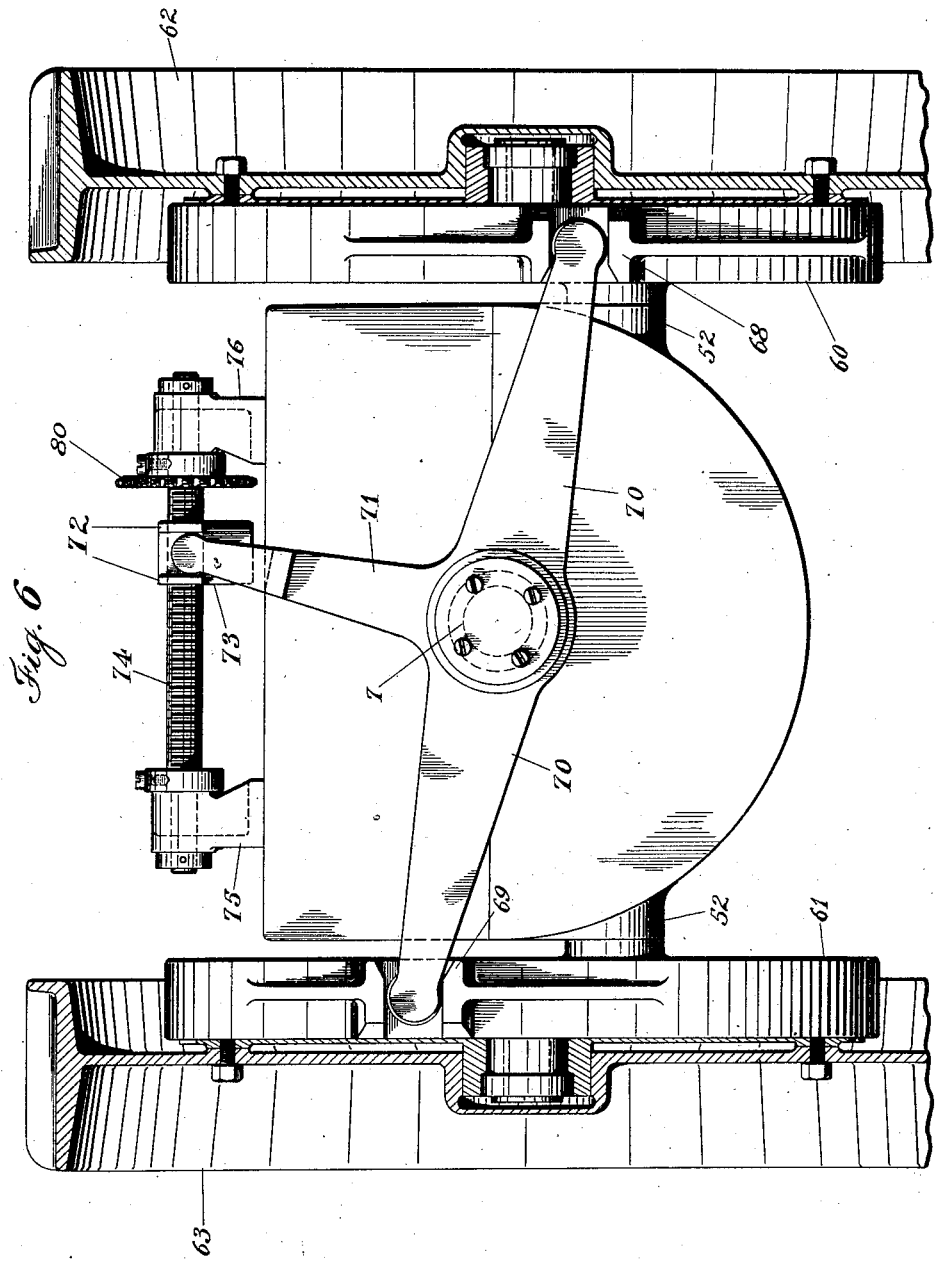

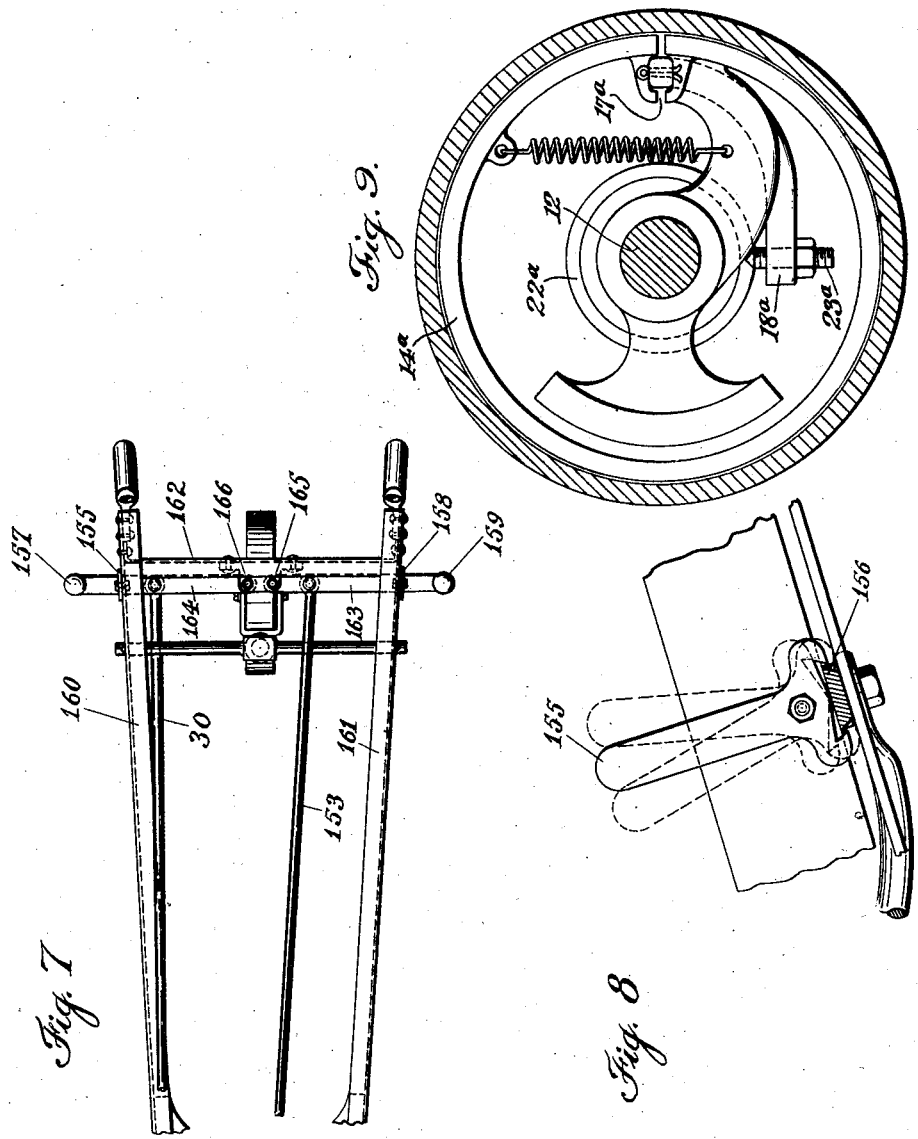

Patented Aug. 30, 1927.

1,640,621

UNITED STATES PATENT OFFICE.

WILLIAM F. SMITH, OF BROOKLYN, NEW YORK, ASSIGNOR OF ONE-HALF TO HERMAN A. SCHATZ, OF POUGHKEEPSIE, NEW YORK.

TRACTOR.

Application filed December 7, 1921. Serial No. 520,703.

This invention relates to tractors and particularly to motor driven tractors, the wheels of which may be vertically displaced with respect to each other.

It is the object of the present invention to provide a properly balanced tractor of simple and strong construction, and the various functions of which may be readily controlled by mechanism occupying a relatively small space.

With these objects in view, one feature of the invention makes provision of vertically movable wheels the relative vertical displacement of which is effected by the lowering of one and raising of the other wheel, or vice versa.

The invention contemplates the use of the tractor motive power for controlling the vertical movements of the wheels and preferably, the necessary power is obtained through the transmission gearing of the tractor.

The raising or lowering of a wheel may be selectively controlled by coupling a suitable mechanism with the forward or backward driving means of the tractor. The selective control is effected by the simple rocking of a lever, means being provided for preventing the displacement of a wheel beyond certain predetermined limits. After e. g., a wheel has been fully raised, the operator cannot apply power further to raise it.

These and other features of the invention will be more clearly understood from the following description and the drawings exemplifying a preferred embodiment of the invention. However, the scope of the present invention is not limited to the particular structures disclosed. Various modifications will obviously appear to those skilled in the art without departing from the spirit of the invention defined in the claims.

Figure 1:
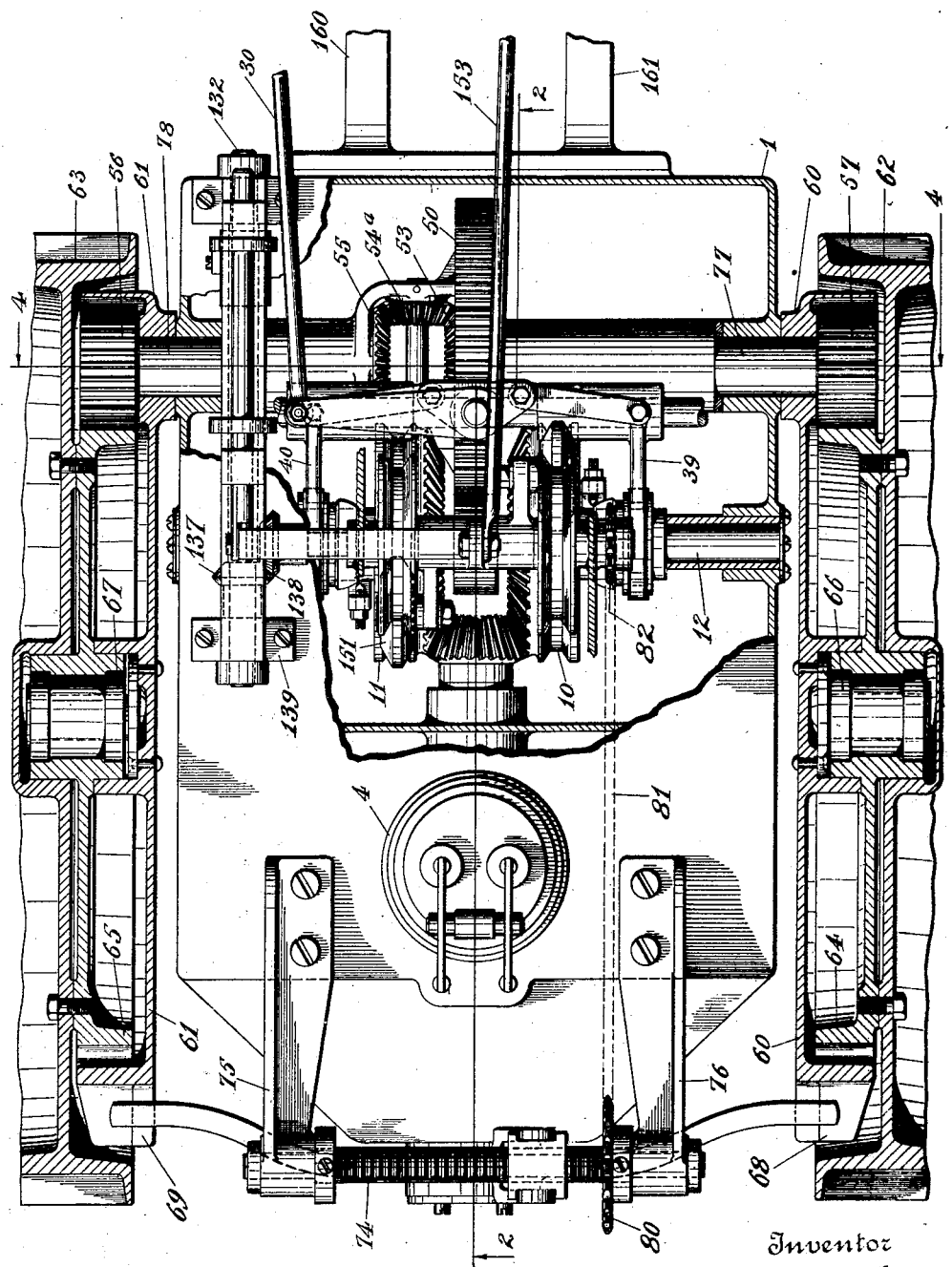
Figure 2:
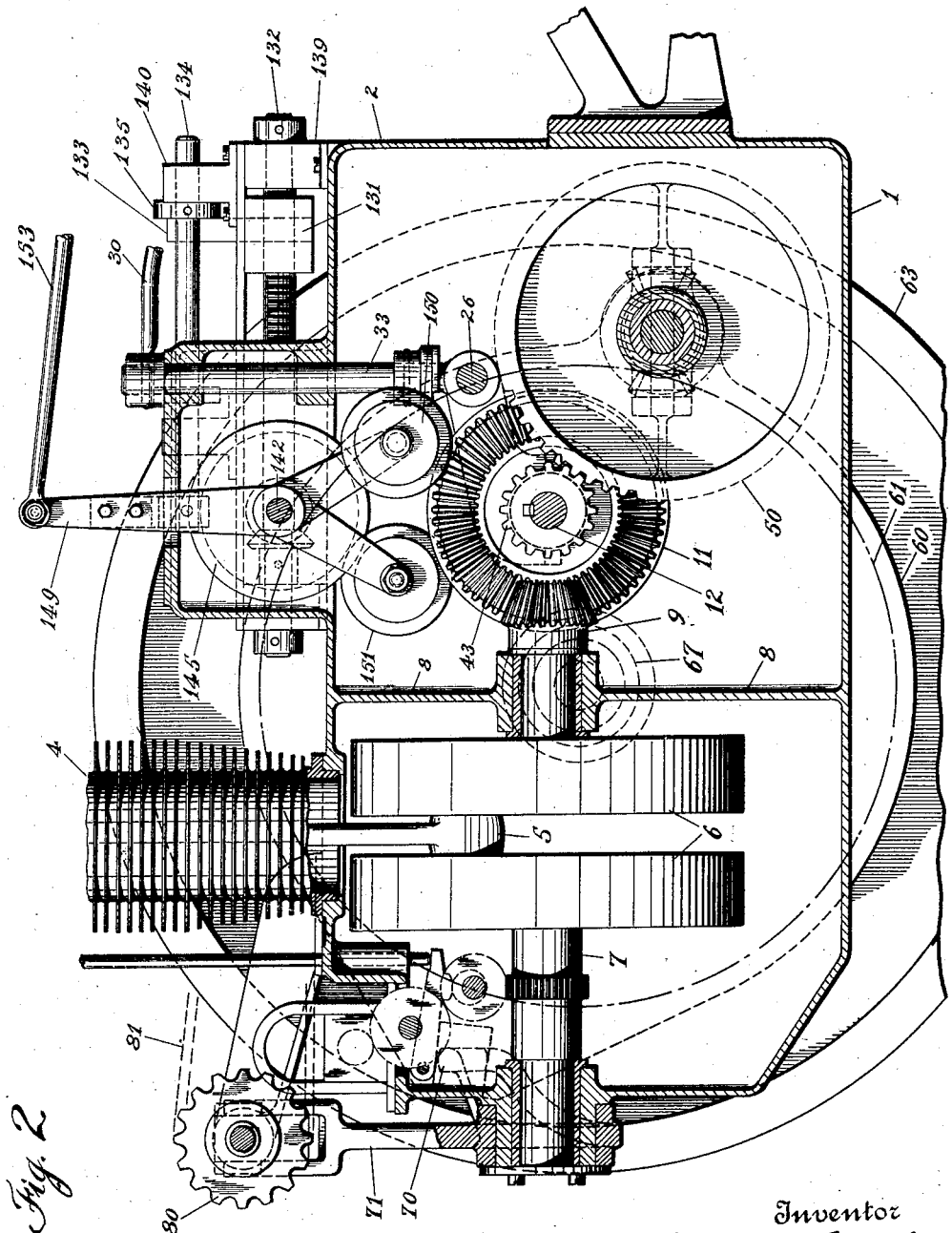

In the drawings, Fig. 1 is a top plan view of the tractor with part of the casing broken away; Fig. 2 is a sectional side view along lines 2—2 of Fig. 1; Fig. 3 is an elevation partly in section of the transmission and clutch operating mechanism; Fig. 4 is a sectional view of the differential and transmission gearing taken along lines 4—4 of Fig. 1; Fig. 5 is a detail view of the stop control; Fig. 6 is a front view of the tractor; Figs. 7 and 8 are detail views of the combination lock and stop for the wheel lift and clutch control levers; and Fig. 9, is a view of the clutch mechanism taken in section along line 9 of Fig. 3.

The operating mechanism of the tractor is supported in a casing consisting of a lower half or sump 1, and an upper half 2. An internal combustion engine 4, preferably of an aircooled type is provided on top of the casing and operates in the well known manner, a crank-shaft 5 connected with flywheels 6. The flywheels 6 are secured to a shaft 7. One end of the shaft 7 is supported in the front part of the casing in a suitable bearing, and a bearing is provided near the other end of this shaft in a rib or wall 8 provided in the casing halves for that purpose. The rear end of shaft 7 carries thereon a bevelled gear 9 intermeshing with the toothed surfaces of gear wheels 10 and 11 of the transmission, and is adapted to rotate these gear-wheels in opposite directions.

The gear wheels 10 and 11 are mounted freely to rotate around the transmission shaft 12 supported in suitable bearings 13—13 in the casing halves 1 and 2 at right angles to shaft 7. By means of clutches preferably of the internal expansion type, the motion of wheels 10 and 11, respectively, may be transmitted to the shaft 12.

The clutches consist of brake-bands 14 and 14ª lying against the inside surfaces of flanges 16 and 15, respectively, provided on gear wheels 10 and 11. The brake-bands are split as shown at 17 and 17ª and may be expanded to frictionally engage the gear wheel flanges. The expanding of the brake bands is effected by arms 18 and 18ª held within rectangular recesses in the brake bands. The brake bands are fastened to hub-caps 19 and 19ª keyed to the shaft 12 by means of keys 20 and 20ª. Extensions of the hub-caps 19 and 19ª carry loosely mounted thereon grooved collars 21 and 21ª which may be longitudinally displaced thereon. Cam like projections 22 and 22ª of collars 21 and 21ª may ride over screws 23 and 23ª provided in angular branches of the arms 18 and 18ª whereby the arms will be tilted for the purpose of expanding the brakebands.

The horizontal displacement of the collars is controlled by a rod 30 which, as viewed in Fig. 3, may be moved upward or downward, (towards or away from the operator). The movement of rod 30 is transmitted to a lever 31, one end of which is pivotally secured to rod 30 at 32. The other end of lever 31 is pinned to a shaft 33, and the lower end of this shaft is secured in a hub 34ª of a centrally pivoted triangular piece 34, the rocking of which is in turn transmitted to connecting links 35 and 36 pivoted to 34 at 37 and 38. The connecting links 35 and 36 are connected with the respective clutches by arms 39 and 40 pivotally connected with 35 and 36 at 41 and 42, and carrying at their free ends yokes 24 and 25 engaging the grooves of collars 21 and 21ª. The arms 39 and 40 are integral with the sleeves 46 and 45 slidably mounted on a shaft 26 supported in the upper half 2 of the casing.

The rotation of shaft 12 is transmitted by a pinion gear 43 keyed thereto, to a gear wheel 50 free to rotate on the extended bushings 77 and 78 secured in the hubs 52—52 of the lower half or sump 1 of the casing by the set screw 3.

The differential consists of the usual intermeshing of bevel gears, two of which, 54 and 54ª are freely mounted between brackets connecting the gear wheel 50 with one of its hubs, and the second pair, 53 and 55 are keyed on the shafts 51—51, said shafts being free to rotate in the core of the bushings 77 and 78.

Substantially circular plates 60 and 61 are excentrically pivoted on the outward extending ends of bushings 77 and 78, and are held horizontally by the casing and the pinion gears 56 and 57 on the shafts 51—51. Tractor wheels 62 and 63 together with bull gears 64 and 65 secured thereto, are supported in the centre of the circular plates in suitable bearings 66 and 67. Opposite the pivots formed by the bushings 77 and 78 each plate 60, 61 has a notched projection 68, 69. The notches of projections 68 and 69 are engaged by the ball shaped ends of a lever 70 rotatably mounted on the casing 2 at the point where shaft 7 projects therethrough.

The forked end of an upwardly projecting arm 71 integral with the lever 70 is engaged by flanges 72 of a screw block 73 cooperating with a screw 74. The screw 74 is rotatably mounted on the upper half 2 of the casing in bearing brackets 75 and 76. The downward extending portion of the screw block 73 fitting in the forked end of the arm 71 prevents the rotation of screw block with the screw 74 whereby, in response to the rotation of screw 74 the block 73 will travel horizontally. The screw 74 may be rotated by means of a sprocket wheel 80 mounted thereon and controlled by a chain 81. The chain 81 is driven by a sprocket wheel 82 mounted on shaft 142.

A screw block 131 cooperates with a screw 132 rotatably mounted on the upper half of casing 2 within a frame 139. The top surface of the screw block 131 engages the upper bar of frame 139 and thereby prevents the rotation of the block with the screw. Stops 135 and 136 provided on a horizontally movable rod 134 may be actuated by finger 133, on the screw block 131 and the displacement of the rod 134 is in turn limited by the stops engaging the bearing blocks 140 and 141 of the frame 139, the rod 134 being slidably mounted in these bearing blocks.

The screw 132 may be rotated by means of a beveled gear 137 mounted thereon and cooperating with a bevelled gear 138 in which shaft 142 journaled in housing 143 of the upper half 2 of the casing terminates. The shaft 142 carries two friction wheels 144 and 145 each having a substantially V shaped groove around its periphery. Between wheels 144 and 145, a collar 146 is loosely mounted on shaft 142, and projecting from this collar are three spirally arranged levers 147, 148 and 149. Discs 150 and 151 are rotatably mounted on the free ends of levers 147 and 148, respectively. The periphery of these discs has an inverted V shape registering with the grooves in wheels 144 and 145 and also with V shaped grooves around the gear wheels 10 and 11 of the transmission. The discs 150 and 151 are normally out of engagement with the grooved wheels but when actuated, will transmit the motion of gear wheel 10 and 11 to the wheels 144 or 145 and thus to the shaft 142. One end of a rod 152 is secured to the lever 149, and the other end to guide rod 134. The free end of lever 149 has pivoted thereto a rod 153.

The operator guides the tractor by means of the handle bars 160 and 161 (Figs. 1 and 7) fastened to the rear of the tractor and held together by a brace 162. Two levers 163 and 164 are pivoted to the brace 162 at 165 and 166, and pivoted to these levers, respectively, are the free ends of rods 30 and 153. Pivoted to bars 160 and 161 are the combination locks and stops 155 and 158 each arranged to engage the bevelled portion like 156, (Fig. 8) provided on levers 164 and 163. The construction of 155 and 156 makes it possible for the rods 30 and 153 to be drawn towards the operator only when the locks and stops are in the left-hand position indicated in dotted lines in Fig. 8, and pushed away from the operator only when the locks and stops are in the right-hand tilted position indicated in dotted lines, and where the locks and stops are in the position shown in full lines in Fig. 8 the rods 30 and 153 cannot be moved.

Attention is called to the manner in which the various parts of the tractor are distributed to insure proper balancing. The tractor wheels are mounted in substantial alinement with the centre line of the tractor. In the front-half are mounted the motor, crank shaft, flywheels and one part of the wheel lift control, and in the rear half the transmission, differential and the other part of the wheel lift control.

The required vertical displacement of the tractor wheels is accomplished by the simultaneous lowering of one and the raising of the other wheel whereby the controlling mechanism may be confined within lesser space than would be required if the wheels were independently lifted and lowered.

With a similar object in view, the bell-crank connection for controlling the clutches is arranged to provide a common clutch operating mechanism adapted successively to actuate the clutches. Due to this arrangement, the lateral space required for shifting the clutches is reduced to a minimum.

*Operations.*—The motor 4 is started in the well-known manner and causes the shaft 7 to revolve. The rotation of the shaft 7 is transmitted to gear wheels 10 and 11 through the agency of gear 9, wheel 11 rotating in a clockwise and wheel 10 in a counter clockwise direction.

If the operator desires to drive in a forward direction, he will tilt the combination lock and stop 155 into the righthand position illustrated in dotted lines in Fig. 8 and then grasp the handle 157 and push it forward. This rotates the lever 164 in a counter clockwise direction, whereby the rod 30 is pushed away from the operator. The bar 30 pushes the lever 31 with it, and the latter in turn rotates the triangular piece 34 in a counter clockwise direction. Looking at the structure as shown in Fig. 3, the movement imparted to the connecting link 36 is transmitted through arm 40 and yoke 25 to the collar 21, causing the cam shaped projection 22 to move outward and away from the screw 23. On the other hand, the arm 39, and yoke 24 are pulled to the right and the latter forces the collar 21$^a$ to engage with its cam shaped projection 22$^a$, the screw 23$^a$. The arm 18$^a$ is tilted to spread the brake band 14$^a$ apart and into frictional engagement with the flange 15 of gear 10. The band 14$^a$, hub 19$^a$ and shaft 12 will therefore be rotated with the gear 10 in a counter clockwise direction.

The pinion 43 transmits this motion to gear 50, and the latter together with differential shaft 51 and the gears 56 and 57 carried at the ends thereof are rotated in a clockwise direction. The gears 56 and 57 drive the gears 64 and 65 and the attached tractor wheels 62 and 63 in a counter clockwise direction, whereby the tractor is moved forward.

If the operator desires to move the tractor backward, he must rotate the lever 164, in opposite direction, which, due to the engagement of bevelled portion 156 on the lever 164 by the lock and stop 155, cannot be done until the lock and stop 155 is moved into the left-hand position shown in dotted lines in Fig. 8. Through the bell-crank connection 30 and 31, the shaft 33 and triangular piece 34 are rotated in a direction opposite to the one in the previous case when the bar 30 was pushed away from the operator. While the triangular piece 34 is moving into its normal position as shown in Fig. 3, the connecting link 35 and arm 39 will push the collar 21$^a$ away from gear 10, but the downward movement of lever 36 will move the collar 21 toward gear 11 into the position shown in the drawing which is the neutral position.

When collar 21$^a$ disengages the screw 23$^a$, due to the resiliency of the brake-band 14$^a$, the arm 18$^a$ is righted. The frictional engagement between 14$^a$ and 15 ceases, and the movement of gear 10 is no more transmitted to shaft 12.

During the further rotation of 34, the above described operations are repeated. However, in the present case, the collar 21$^a$ is moved outward and the collar 21 is moved toward gear 11. Through the associated clutch mechanism, the clockwise rotation of the gear 11 is transmitted to shaft 12, and through the transmission shaft to the tractor wheels to cause the backward movement of the tractor.

*Wheel lifting.*—If it is desired to raise the wheel 62 and lower wheel 63, the operator pulls toward him the lever 163 by means of handle 159, after having thrown the combination lock and stop 158 into the right-hand position shown in dotted lines, for 155, in Fig. 8. The bar 163 pulls the rod 153 toward the operator and the latter rotates the lever 149 in a manner to move friction disc 150 between gear 10 and wheel 144, and the disc 151 away from gear 11 and wheel 145. The rotation of gear 10 is, therefore, transmitted through disc 150 to wheel 144 and the latter rotates the shaft 142, and the sprocket 82 and bevelled gear 138 carried thereby in a counter clockwise direction.

Through the chain 81, and sprocket wheel 80, the sprocket wheel 82 causes the counter clockwise rotation of the screw threaded shaft 74. The rotation of screw 74 causes the block 73 to travel toward the left, in Fig. 3. By means of the arm 71, the block 73 rotates the lever 70 in a counter clockwise direction, whereby the plates 60 and 61 are caused to rotate in opposite directions around the pivots.

The tractor wheels being centrally mounted on plates 60 and 61, wheel 62 will be raised and wheel 63 will be lowered from its normal position.

The opposite effect is attained if the bar 153 is pushed away from the operator. The friction disc 151 will now transmit the rotation of gear 11 to wheel 145. The sprocket 82 and gear 138 are now rotated in a direction opposite to the one resulting from the actuation of disc 150. This results in the driving of the block 73 by the screw 74 toward the right, in Fig. 3. The lever 70 rotates the plates 60 and 61 in a manner to lower wheel 62 and raise wheel 61.

It should be noted that the lever 70 is loosely coupled with the wheels and that jaws 68 and 69, through the agency of which such coupling is effected, need not be of excessive length to prevent the slipping out of the lever during rotation. This is so because normally the lever is at an angle to the horizontal (see Fig. 6), and its rotation to cause a relative vertical displacement of the wheels will result in a lesser horizontal displacement of the lever ends than if we started with the lever in a horizontal position.

The movement of the block 73 is confined within the predetermined limits by automatically operating means that prevent the operator from continuing to force the block forward or backward after it reached its predetermined final position.

Due to the rotation of the shaft 142, the bevelled gear 138 may be made to rotate in a clockwise or counter clockwise direction. The motion of gear 138 is transmitted through gear 137 to the screw threaded shaft 132. For this reason, simultaneously with the movement of block 73 the block 131 is caused to travel between stops 135 and 136. When the block 73 is nearing the limit of its movement, the finger 133 on the block 131 will have moved the stop 136 into engagement with 141. The bar 134 is displaced from right to left (Fig. 5), and moves arm 152 to rock the lever 149 backward (Fig. 4). This removes the friction disc 150 from between gear 10 and wheel 144, and the power transmission to screw 74 ceases. At the same time, the lever 149 pulls the rod 153 and lever 163 away from the operator until lever 163 is stopped by the combination lock and stop.

When the guide rod 134 is moved in a right-hand direction due to the stop 135 being forced against 140 (this will occur when block 73 is in its extreme right-hand position) the arm 152 causes the rocking of lever 149 in the opposite direction. In this case, the disc 151 will be moved from its actuated into its normal position, and the rod 153 and lever 163 pulled toward the operator until arrested by the combination lock and stop.

What I claim is:—

1. In a tractor, a motor shaft, two wheels, supports for said wheels, means for connecting said wheels with said shaft to cause their rotation in a forward or backward direction, a three armed lever, a screw, a screw block mounted thereon and engaging one arm of said lever the other two arms engaging the supports for said wheels, and a driving connection between said shaft and screw.

2. In a tractor, two wheels, forward and backward driving means therefor, mechanism controlled by the forward driving means for raising one wheel, and mechanism controlled by the backward driving means for raising the other wheel.

3. In a tractor two wheels, forward and backward driving means therefor, mechanism controlled by the forward driving means for lowering one wheel, and mechanism controlled by the backward driving means for lowering the other wheel.

4. In a tractor, two wheels, forward and backward driving means therefor, means controlled by the forward driving means for raising one and lowering the other wheel, and means controlled by the backward driving means for lowering said one and raising said other wheel.

5. In a tractor, two wheels, forward and backward driving means therefor, means controlled by the forward driving means for simultaneously raising one and lowering the other wheel, and means controlled by the backward driving means for simultaneously lowering said one and raising said other wheel.

6. In a motor driven tractor, two wheels, two oppositely rotating gears for driving said wheels forward and backward, mechanism for raising and lowering said wheels and selectively operable means for transmitting power to said mechanism from either one of said gears.

7. In a motor driven tractor, two wheels, two oppositely rotating gears for driving said wheels forward and backward, mechanism for raising and lowering said wheels, selective means operable at will for transmitting power to said mechanism from either one of said gears, and automatic means controlled by said mechanism for controlling said selective means.

8. In a motor driven tractor, two wheels, two oppositely rotating gears for driving said wheels forward and backward, a screw threaded shaft having a cooperating screw block, selectively operable mechanism for transmitting the rotation of one or the other gear to said shaft, means responsive to the traveling of said screw block in one direction for raising one and lowering the other wheel, and means responsive to the traveling of said screw block in the opposite direction for lowering said one and raising said other wheel.

9. In a tractor, a motor shaft, two wheels, means for connecting said wheels with said shaft, a three armed lever, a screw, a screw block mounted thereon and engaging one arm of said lever, connections between the other two arms of said lever and said wheels, a driving connection between said shaft and screw, and automatic means for rendering said driving connections inoperative.

10. In a tractor, a motor shaft, two wheels, means including oppositely rotating gear wheels for transmitting the rotation of said shaft to said wheels in a forward or backward direction, a lever, means for causing said lever to travel in one direction under the control of one gear wheel, means for causing said lever to travel in the opposite direction under the control of another gear wheel, means responsive to the travel of said lever in said one direction for raising one and lowering the other wheel, means responsive to the travel of said lever in the opposite direction for lowering said one and raising the other wheel, two stops for limiting the travel of said lever, and means responsive to the actuation of said stops for removing said lever from under the control of said gear wheels.

11. In a motor driven tractor, two wheels, two oppositely rotating transmission gear wheels, a shaft, two friction wheels secured to said shaft, two freely rotating friction discs, two screw threaded shafts having cooperating screw blocks, means controlled by said shafts for rotating said screw threaded shaft, means responsive to the traveling of said screw blocks in one direction for raising one and lowering the other wheel, means responsive to the traveling of said screw blocks in the opposite direction for lowering said one and raising said other wheel, means operable at will for interposing one of said discs between a friction and a gear wheel or the other disc between the other friction and the other gear wheel, and automatic means controlled by one of said screw blocks for controlling the moving of said discs.

12. In a tractor, a motor driven transmission shaft, two rotatably mounted plates, a wheel mounted on each plate, two oppositely rotating gears on said shaft, means for transmitting the rotation of said gears to said wheels, a second shaft, a bevelled gear, a sprocket wheel and two friction wheels secured to said second shaft, a freely rotating collar mounted on said second shaft, three spirally displaced levers projecting from said collar, a freely rotating friction disc carried by each one of two of said levers, two screw threaded shafts having cooperating screw blocks, means controlled by said sprocket wheel for rotating one and means controlled by the bevelled gear for rotating the other screw threaded shaft, a lever controlled by one of said screw blocks engaging said plates, means responsive to the traveling of said one of said screw blocks to rotate said lever, means operable at will for rotating said collar in one direction to move one disc to engage a friction and a gear wheel and in the opposite direction for moving the other disc to engage the other friction and other gear wheel, movable stops for limiting the displacement of the other screw block, and a lever controlling said collar actuated by said stops.

13. In a motor driven tractor, two wheels, two oppositely rotating gears for driving said wheels forward and backward, a second shaft, two friction wheels secured to said second shaft, a freely rotating collar mounted on said second shaft, two spirally displaced levers projecting from said collar, a freely rotating friction disc, carried by each one of said levers, two screw threaded shafts having cooperating screw blocks, means controlled by said second shaft for rotating said screw threaded shafts, means responsive to the traveling of one of said screw blocks in one direction for raising one and lowering the other wheel, means responsive to the traveling of said one of said screw blocks in the opposite direction for lowering said one and raising said other wheel, means operable at will for rotating said collar in one direction to move one disc to engage a friction and a gear wheel and in the opposite direction for moving the other disc to engage the other friction and other gear wheel, movable stops for limiting the displacement of the other screw block, and a lever controlling said collar actuated by said stops.

14. In a tractor, a motor driven transmission shaft, two wheels, two oppositely rotating gear wheels on said shaft, V shaped grooves around the peripheries of said wheels, a second shaft, a bevelled gear, a sprocket wheel and two friction wheels secured to said second shaft, a freely rotating collar mounted on said second shaft, V shaped grooves around the peripheries of said friction wheels, three spirally displaced levers projecting from said collar, a freely rotating friction disc having an inverted V shaped rim carried by each one of two of said levers, two screw threaded shafts having cooperating screw blocks, means controlled by said sprocket wheel for rotating one and means controlled by the bevelled gear for rotating the other screw threaded shaft, means responsive to the traveling of said screw blocks in one direction for raising one and lowering the other wheel, means responsive to the traveling of said screw blocks in the opposite direction for lowering said one and raising said other wheel, means operable at will for rotating said collar by means of its third lever in one direction to move one disc to engage with its rim the grooves of a friction and a gear wheel and in the opposite direction for moving the other disc to engage with its rim the grooves of the other friction and the other gear wheel, movable stops for limiting the displacement of one of said screw blocks, and a lever controlling said third lever actuated by said stops.

15. In a tractor, a casing, a motor shaft having one end mounted in the forward part of the casing, a bevelled gear carried by the other end of said shaft, two bevelled gears cooperating with said gear, a motor mounted on said casing above said shaft, a second shaft mounted beyond the centre line of said casing at right angles to said motor shaft and carrying two bevelled gears, a pinion and two clutches, a driving shaft mounted in the rear part of the casing parallel with second shaft, a gear wheel cooperating with said pinion and differential gearing carried by said driving shaft, two plates each excentrically fulcrumed around the ends of the driving shaft outside of said casing, a wheel rotatably mounted on each plate substantially in alinement with the centre line of the casing, driving connections between the ends of said driving shaft and the wheels, a lever fulcrumed on the front end of said casing around said one end of said motor shaft, a fulcrum connection between each end of said lever and a plate, screw threaded means for rotating said lever mounted on said casing above said lever, and an operating shaft for said screw threaded means mounted in said casing above said second shaft.

16. In a tractor, two wheels, two members upon which said wheels are journaled, a motor driven shaft for rotating said members around a common axis, fulcrum points around which said members may be bodily rotated, and a lever loosely engaging said two wheels at different points of their periphery whereby in the normal position of the two wheels, the lever is at an angle to the horizontal.

17. In a tractor, two wheels, two members upon which said wheels are journaled, a motor driven shaft, a gear wheel at each end of said shaft engaging a wheel at a circumferential point, motor driven mechanism for vertically displacing one of said wheels with respect to the other, a centrally pivoted lever having free ends loosely engaging said two members at different points of their periphery whereby, in the normal position of the wheels, the lever is at an angle to the horizontal, and means controlled by said mechanism for rotating said lever to raise one and lower the other wheel.

In testimony whereof, I have signed my name to this specification, this 6th day of December 1921.

WILLIAM F. SMITH.